United States Patent

[11] 3,618,593

| [72] | Inventors | Choudomir Kirilov Nachev;<br>Garo Bohos Astardjian; Hristo Radey Hristov; Kiril Kirilov Boev, all of Sofia, Bulgaria |
|---|---|---|
| [21] | Appl. No. | 777,575 |
| [22] | Filed | Nov. 21, 1968 |
| [45] | Patented | Nov. 9, 1971 |
| [73] | Assignee | Institut Po Technitcheska Kibernetika Pri Ban<br>Sofia, Bulgaria |
| [32] | Priority | Sept. 2, 1968 |
| [33] | | Bulgaria |
| [31] | | 10595 |

[54] METHOD OF AND A SYSTEM FOR THE AUTOMATIC ANALYSIS OF HEART DISTURBANCES
4 Claims, 6 Drawing Figs.

[52] U.S. Cl. .................................................. 128/2.06 A
[51] Int. Cl. .................................................. A61b 5/04
[50] Field of Search .......................................... 128/2.05 P, 2.05 S, 2.06 A

[56] References Cited
UNITED STATES PATENTS

| 3,144,019 | 8/1964 | Haber | 128/2.06 |
| 3,267,934 | 8/1966 | Thornton | 128/2.06 |
| 3,280,817 | 10/1966 | Jorgensen et al. | 128/2.05 S |
| 3,294,084 | 12/1966 | Schuler et al. | 128/2.06 |
| 3,318,303 | 5/1967 | Hammacher | 128/2.05 S |
| 3,352,300 | 11/1967 | Rose | 128/2.06 |
| 3,384,075 | 5/1968 | Mitchell | 128/2.06 |

FOREIGN PATENTS

| 911,078 | 11/1962 | Great Britain | 128/2.06 |

*Primary Examiner*—William E. Kamm
*Attorney*—Karl F. Ross

ABSTRACT: A device or system for automatically analyzing disturbances of heart rhythm and a method of such analysis wherein a sequence of cardiac waves, e.g. as generated by a transducer attached to the body of a patient is converted into normal pulses occurring within predetermined time intervals following a preceding pulse. The disturbance is characterized by delayed pulses occurring at a greater time interval for accelerated pulses with a shorter interval. Information is stored in a memory in the form of sequences of such pulses representing various cardiac conditions and and a contemporary condition is compared with the stored information to produce output signals indicating the condition.

Choudomir K. Nachev
Garo B. Astardjian
Hristo R. Hristov
Kiril K. Boev
INVENTORS.

BY

Karl G. Ross
Attorney

METHOD OF AND A SYSTEM FOR THE AUTOMATIC ANALYSIS OF HEART DISTURBANCES

The invention relates to a device for the automatic analysis of the disturbances in rhythm of the cardiac activity with subsequent recording of the number of the typical irregularities detected.

The analysis of the cardiac rhythm, which is the object of the present invention, is done on the basis of measuring the duration of the interval between two successive characteristic pulses (the R-wave of the QRS complex of the EGG). The frequency of the cardiac rhythm fluctuates within certain standard limits, each deviation from these standard limits being considered as a disturbance subject to the respective interpretation. The characteristic pulses are divided into normal and abnormal ones, depending on whether their appearance is within the standardized limits or not.

The appearance of abnormal characteristic pulses is a disturbance in the rhythm of the heart. Typical disturbances or irregularities are predefined sequences of varying numbers of normal and abnormal characteristic pulses. The automatic analysis of the disturbances in the rhythm of cardiac activity is the identification of the current sequences by assigning them to the separate categories of typical disturbances.

The familiar devices for continuous observation and personal visual analysis, including tape-recorded registration with retrospective oscilloscopic control of the R—R interval (spacing between two R waves), as well as the complex systems making use of digital computers with specialized input devices, have a number of shortcomings which highly restrict their universal application in the automatic analysis of the heart by using objective criteria providing for comparability of the results obtained.

One object of the invention is to create a device for and a method of carrying out quantitative and qualitative analyses of the rhythm of cardiac activity over a period of unlimited duration.

The underlying principles of the device are the following:

1. Individually set standardized frequency limits are provided for each individual patient, namely:
   a. Upper frequency limit, with a frequency of $f_1$ and a period of repetition $t_1 = 1/f_1$
   b. Lower frequency limit, with a frequency of $f_2$ and a recurrence period of $t_2 = 1/f_2$, whereby $f_1 > f_2$.

2. At the moment of its appearance, every characteristic pulse is classified into a separate type, normal or abnormal, the latter falling into two categories, accelerated (early) or delayed (late). According to this principle the pulse types are as follows:
   a. Normal pulses, symbolically designated by $\alpha_0$, are:
      1. The first pulse of the rhythm investigated
      2. Every n-pulse ($n=2,3,—K/$) provided the time $t_n$ measured from the moment of its appearance to the closest preceding pulse, categorized as normal or delayed, corresponds to the standardized limits, i.e. $t_1$ $t_n$ $t_2$.
   b. Delayed pulses, symbolically designated by $\alpha_2$, are every n-pulse ($n=2,3,—K$) provided the time $t_n$ measured from the moment of its appearance to the closest preceding pulse, categorized as normal or delayed, is longer than the corresponding standardized limits, i.e. $t_n > t_2$.
   c. Accelerated pulses, symbolically designated by $\alpha_2$, are every n-pulse ($n=2,3,—K$) provided the time $t_n$ measured from the moment of its appearance to the closest preceding pulse, categorized as normal or delayed, is shorter than the corresponding standardized limits, i.e. $t_n < t_1$.

3. As a result of the categorization of the characteristic pulses, the cardiac rhythm is transformed into a sequence composed of the pulses $\alpha_0$, $\alpha_1$, and $\alpha_2$.

The automatic analysis of the rhythmic process consists of comparing the incoming nonsequences with predetermined sequences of $\alpha_0$, $\alpha_1$, and $\alpha_2$, accepted as typical, the presence of a disturbance or irregularity of the respective type being noted and counted at the moment of coincidence.

A normal cardiac activity will be manifested by a sequence of the following type:

(y1)    $\alpha_0, \alpha_0, \alpha_0$    $\alpha_0, \alpha_0$

For the sake of convenience in describing the typical irregularities, we shall also introduce the symbols $\alpha_3$ and $\alpha_4$ which designate the appearance of a normal or delayed pulse and the appearance of a normal or accelerated pulse respectively, i.e.

(y2)    $\alpha_3 = \alpha_0 + \alpha_1$ (y3)    $\alpha_4 = \alpha_0 + \alpha_2$ In the model variant the following sequences have been defined as typical disturbances:

a. Systematic acceleration (tachycardia) symbolically designated with Q:
   (y4)    $\alpha_0, \alpha_2, \alpha_1, \alpha_2, \alpha_1$    $\alpha_2, \alpha_4$
   (y5)    $\alpha_0, \alpha_2, \alpha_1, \alpha_2, \alpha_1$    $\alpha_2, \alpha_1, \alpha_3$
   The total number of pulses of the $\alpha_1$ and $\alpha_2$ types is $N$ 5.

b. Systemic retardation (bradycardia), symbolically designated with U:
   (y6)    $\alpha_0, \alpha_1, \alpha_1, \alpha_1$    $\alpha_1, \alpha_4$
   The total number $N$ of the pulses of the $\alpha_1$ type is $N$ 5.

c. Group of accelerated pulses (extrasystoles), symbolically designated with R:
   (y7)    $\alpha_0, \alpha_2, \alpha_2, \alpha_0$
   (y8)    $\alpha_0, \alpha_2, \alpha_1, \alpha_3$
   (y9)    $\alpha_0, \alpha_2, \alpha_1, \alpha_2, \alpha_4$
   (y10)   $\alpha_0, \alpha_2, \alpha_1, \alpha_2, \alpha_1, \alpha_3$ d. Group of delayed pulses, symbolically designated by V:
   (y11)   $\alpha_0, \alpha_1, \alpha_1, \alpha_4$
   (y12)   $\alpha_0, \alpha_1, \alpha_1, \alpha_1, \alpha_4$
   (y13)   $\alpha_0, \alpha_1, \alpha_1, \alpha_1, \alpha_1, \alpha_4$ c. A single accelerated pulse (interpolated extrasystole), symbolically designated by S:
   (y14)   $\alpha_0, \alpha_2, \alpha_0$ f. A single delayed pulse (blocked), symbolically designated by W:
   (y15)   $\alpha_0, 60_1, \alpha_4$ In addition to the sequences referred to above and adopted in the model variant, it is possible to define other variants as well by way of irregularities or disturbances, should the investigators show particular interest in them.

4. Differentiated as a relatively separate category are irregularities of the type of characteristic pulses with polarity that is inverse to the one adopted, i.e. inverted characteristic pulses.

In the drawings

FIG. 1 shows the block diagram of the device together with the biological object.

FIG. 2. shows the block diagram of the amplifier-former block.

Figure 1:
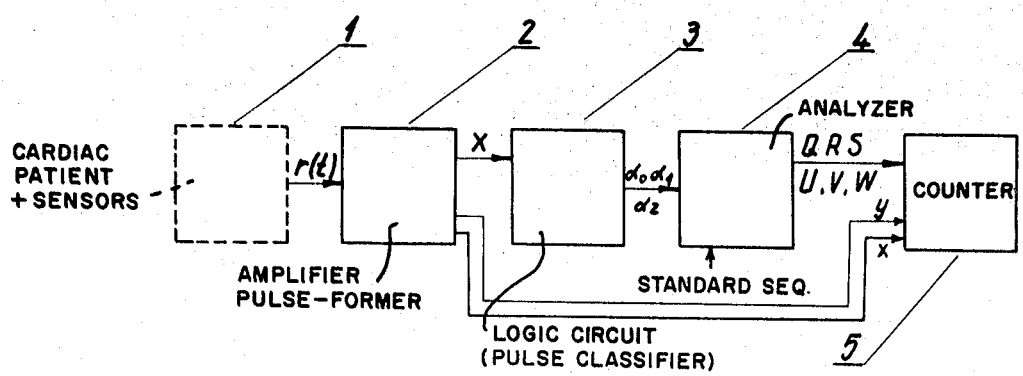

The diagram on FIG. 1 contains the following:

Block 1—this is the biological object. The connection between the objects and the input biological amplifier is realized by electrocardiographic electrodes (sensors) or by a telemetric cardiographic device.

Block 2—an input amplifier-former block converting the incoming information ($rt$) into characteristic pulses X. The pulses with polarity opposite to the normal one are separated according to the output Y.

Block 3—a logic block affecting the categorization of the characteristic pulses X into pulses of the types $\alpha_0$, $\alpha_1$, and $\alpha_2$.

Block 4—an analyzer block designed to perform the comparison between the current sequence of $\alpha_0$, $\alpha_1$, and $\alpha_2$ and the above-defined standard sequences for the individual typical disturbances. It has six outputs for the separate typical disturbances.

Block 5—a counting block designed to sum up the number of classified disturbances or irregularities of the different types. The block is provided with counters for the six typical disturbances, for the total number of characteristic pulses processed, and for the pulses of opposite polarity.

Figure 2:
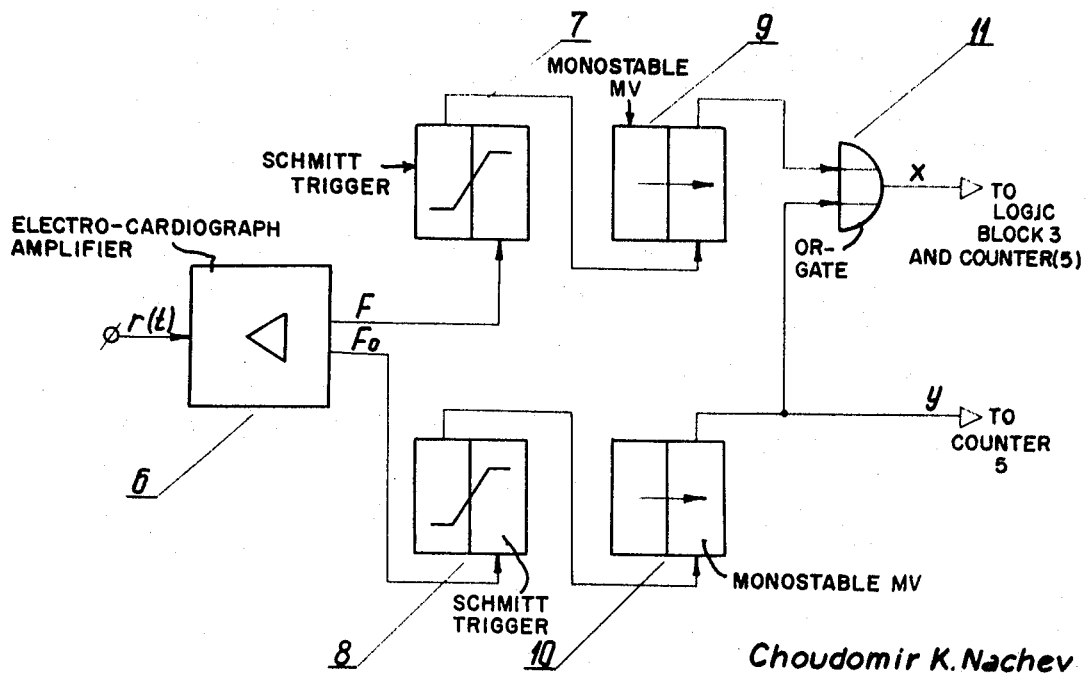

The operation of the device is as follows: the input information $rt$ enters block 2 (FIG. 2) in which the characteristic pulses are amplified and are formed into pulses of standard amplitude and width. In FIG. 2, reference character 6 shows a symmetrical AC electrocardiographic amplifier with two outputs, namely: F for the basic polarity and $F_0$ for the pulses of opposite polarity. The signals F and $F_0$ are formed and discriminated in the Schmitt triggers 7 and 8, while in the monostable circuits 9 and 10 they are standardized as regards height. The appearance of the characteristic pulses with opposite polarity, regardless of their temporary position with respect to the preceding one, are viewed as disturbances of a separate category and are sent via the output channel Y for counting in Block 5 (FIG. D). By the OR-gate 11 the signals of opposite polarity are added to those with normal polarity and, along the output X, they are sent to Block 3 for the purpose of classification.

Figure 3:
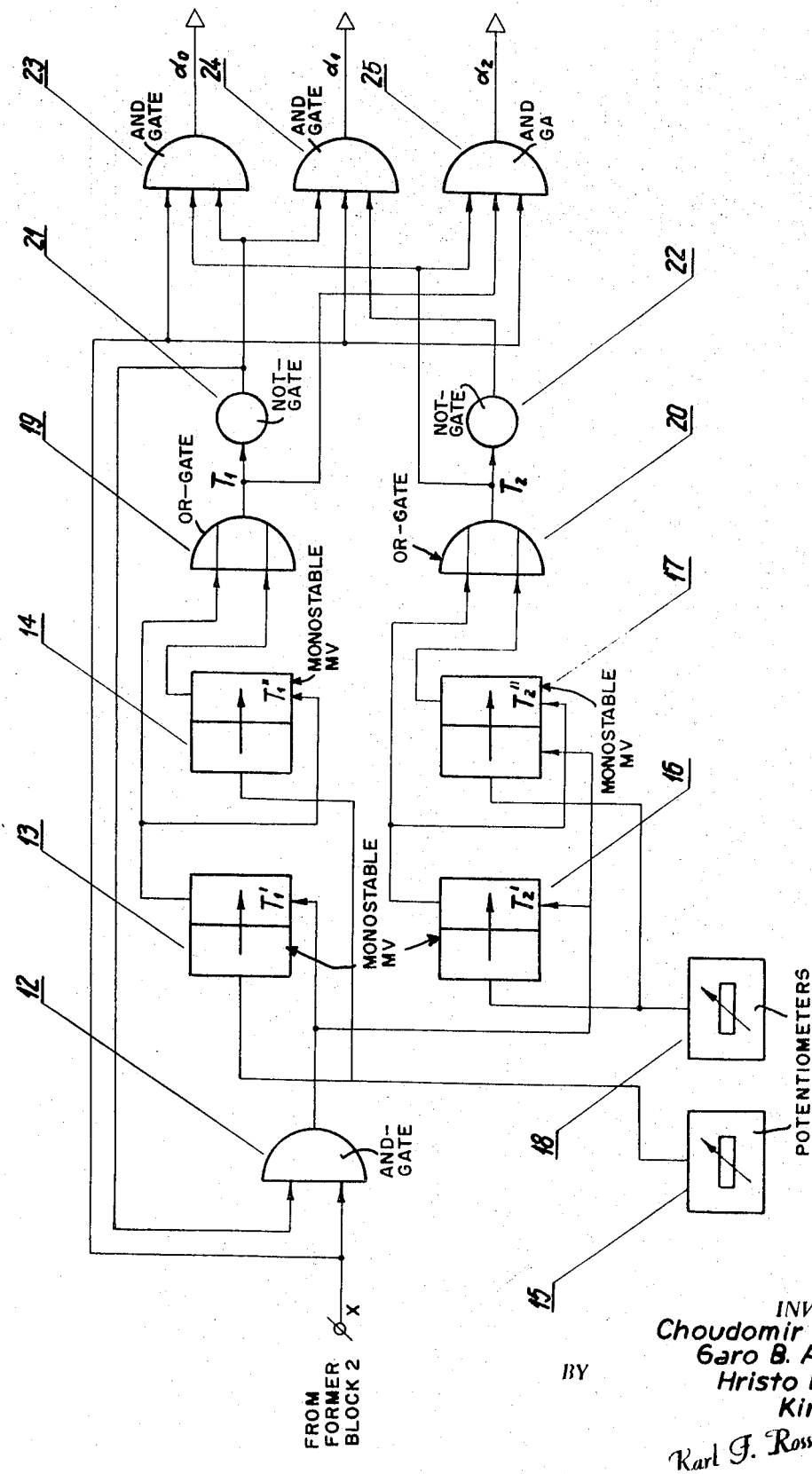
FIG. 3 shows in principle the diagram of the logic block.

The details of Block 3 is shown in FIG. 3. The block contains two groups of timing elements of the monostable circuits, namely: $T_1$—compose of $T_1'$ and $T_1''$ 13 and 14 with duration of their unstable state $T_1=T_1'+T_1''=t_1=1/f_1$ determined by the upper standardized frequency limit; and $T_2$ of $T_2'$ and $T_2''$ respectively 16 and 17 with time duration $T_2=T_2'+T_2''=t_2=1/f_2$ determined by the lower frequency limit. The timing elements $T_1$ and $T_2$ are controlled by potentiometers 15 and 18 respectively, the dependence between the duration of their unstable states and the control voltage being a hyperbolic one, so that the dials of the potentiometers 15 and 18 are linear.

The operation of the block is as follows: the appearance of each normal or late characteristic pulse X="1," wherein 1 is the accepted logical state "1", through the AND-gate 12 causes the simultaneous actuation of $T_1$ and $T_2$. In case the subsequent pulse is a normal one ($\alpha_0$), it must appear in the normally expected time state $T_1=0$, $T_2=1$. The appearance of a normal pulse causes a new actuation of $T_1$ and of the first half of $T_2'$ accompanied by a simultaneous interruption of $T_2''$. The changes in the frequency of the cardiac rhythm, restricted within the frameworks of the standardized limits, do not affect the operation of the circuit. They determine the moment of appearance of X with regard to the expiry of the time $T_1$.

Upon the appearance of a delayed pulse ($\alpha_1$), the states of the timing elements are $T_1=0$, $T_2=0$ and, upon its appearance, $T_1'$ and $T_2'$ are activated again.

Upon the appearance of an accelerated pulse ($\alpha_2$), the states of the timing elements are $T_1=1$, $T_2=1$ and, upon its appearance, no new actuation is envisaged in view of the blocking of the input by $T_1$ through the AND-gate (12).

The two halves of $T_1$ and $T_2$ are summed up in the OR-gates 19 and 20.

The logic equations for the outputs of the block are as follows: (y16) $\alpha_0=X.T_1.T_2$ (y17) $\alpha_1=X.T_1.T_2$ (y18) $\alpha_2=X.T_1.T_2$ The outputs are obtained at the AND-gates, 23, 24, and 25 respectively, the inversions of the times $T_1$ and $T_2$ being obtained through the Nat-gates 21 and 22 respectively.

Figure 4A:
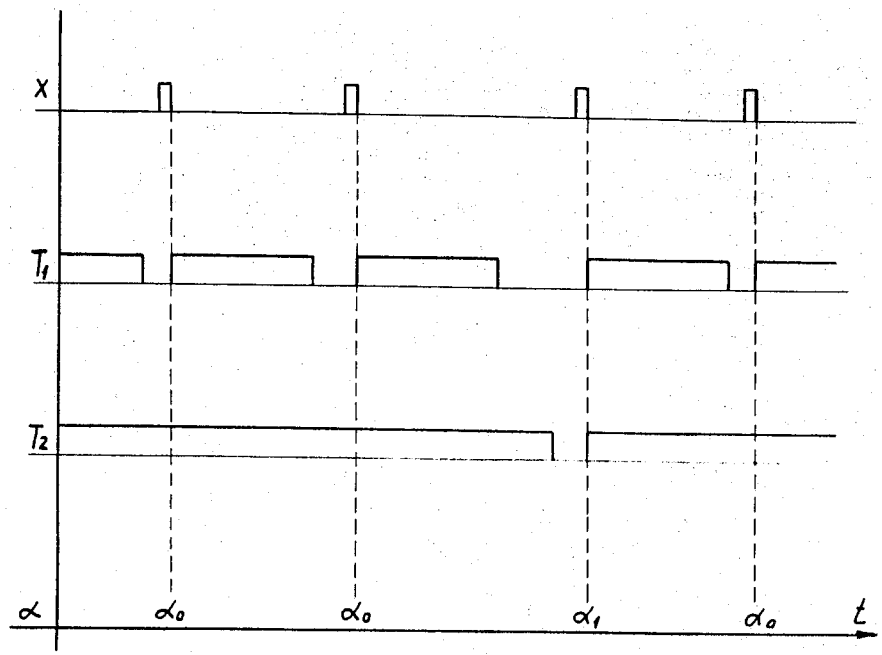
FIGS. 4a and 4b are a graphic presentation of the operation of the logic block.
Figure 4B:
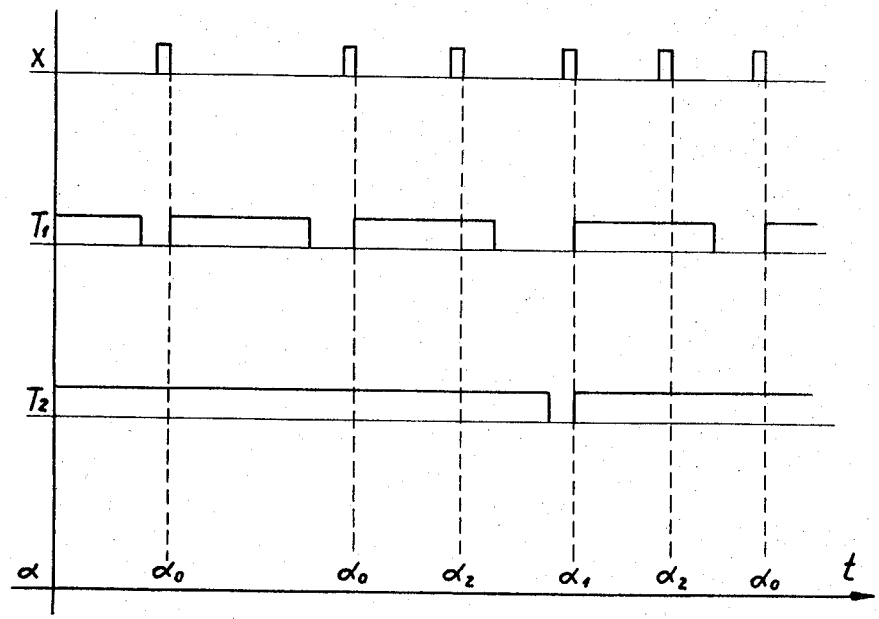

Graphically, the operation of the logic block has been shown in FIG. 4, in which $4^a$ is normal cardiac activity with one blocking pulse and $4^b$ shows a group of accelerated pulses.

Figure 5:
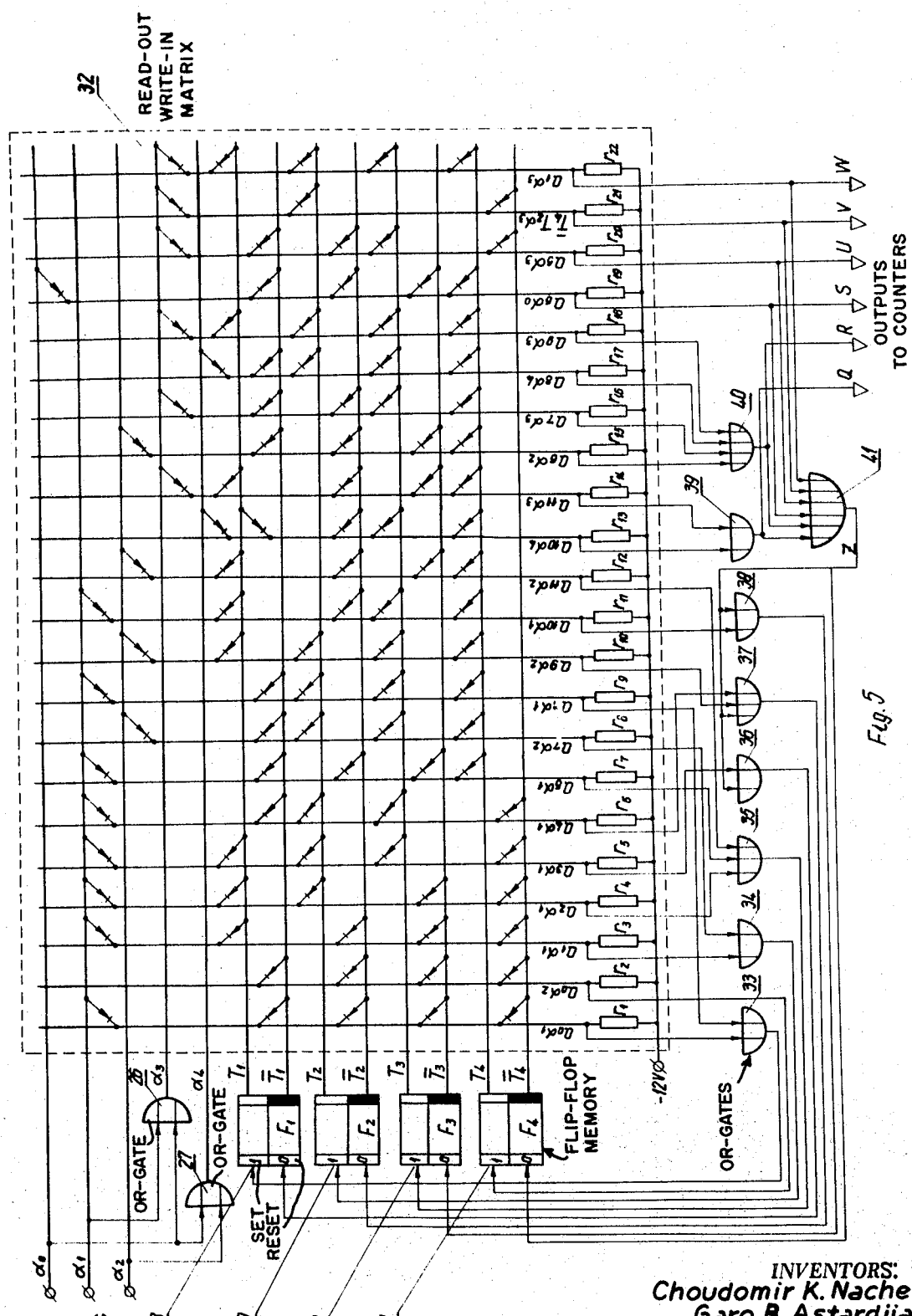
FIG. 5 shows in principle the diagram of the analyzer block.

For the purpose of carrying out the analysis, Block 4 (FIG. 5) is constructed as a finite automaton with a combination section (items 32, 33, 41) and memory of set-reset flip-flops 28, 29, 30, and 31 in which the memorization takes place of the above-mentioned sequences from (y4) to (y15) as well as (y1), and pulses are formed at the outputs Q, R, S, U, V, and W upon the appearance of the respective disturbances, namely:

—at output Q upon each "systemic acceleration"
—at output R upon each "extrasystole"
—at output S upon each "interpolated extrasystole" (y19)
—at output U upon each "systemic retardation"
—at output V upon each "group of delayed pulses"
—at output W upon each "blocked pulse"

The structure of the analyzer block is obtained after the familiar methods of the theory of finite automata, due use being made of the recurrent equations from (y4) to (y15) and the condition (y19). In the preferred variant, the automaton has 12 internal states conventionally designated by $A_i$, wherein $i=0,1,2,\ 11$, and to each one of these states there is a corresponding code combination of states of the triggers 28, 29, 30, and 31.

Table 1 shows an enumeration of all internal states of the automaton (2nd column). It also shows the adopted corresponding states of triggers 28, 29, and 31 (third column), and the memorized sequence of classified pulses corresponding to the particular state (fourth column).

0001 NO CARD FOR THIS ILLUSTRATION.
A

The inputs of the triggers marked with 1 are set inputs, i.e. a transition from 1 into 0 at the first output transforms the respective trigger into a state 1. The inputs marked with 0 are reset inputs, i.e. a transition from 1 into 0 at the reset output transfers the respective trigger into an 0 state. The output marked with 1 of a given trigger is the one with regard to which the state of the trigger is determined. The other output is the negative output of the trigger.

Let us denote by $S_F$ and $R_F$ ($K=1,2,3,4$) the set and reset inputs of triggers FK respectively. From table 1 it is easy to obtain logic functions governing the triggers, namely:

(y20) $S_{F1}=A_0\alpha_1+A_8\alpha_1$
(y21) $S_{F2}=A_1\alpha_1+A_7\alpha_2$
(y22) $S_{F3}=A_2\alpha_1+A_6\alpha_1+A_{11}\alpha_2$
(y23) $S_{F4}=A_0\alpha_2$
(y24) $R_{F1}=A_3\alpha_1+Z$
(y25) $R_{F2}+A_4d_1+A_9\alpha_2+Z$
(y26) $R_{F3}=A_{10}\alpha_1+Z$
(y27) $R_{F3}=Z$ The quantity designated by Z will be explained below.

The logical equations with which a signal is formed at the outputs Q, R, S, U, V, and W in accordance with equations /y1/, (y4) (y15), and table 1 are as follows:

(y28) $Q=A_{10}\alpha_4+A_{11}\alpha_3$
(29) $R=A_6\alpha_2+A_7\alpha_3+A_8\alpha_4+A_9\alpha_3$
(y30) $S=A_6+_0$
(y31) $U=A_5\alpha_3$
(y32) $V=/A_2+A_3+A_4/\alpha_3=T_4 \cdot T_2 \cdot \alpha_3$
(y33) $W=Q_1 \cdot \alpha_3$ After the recording of a certain irregularity and after a signal has been formed in accordance with equations (y28) to (y33), the memory, i.e. triggers 28, 29, 30, and 31 must return to the zero state, i.e. the automaton must pass over into an initial state $A_0$. Let us use Z to designate the logical function:

(y34) $Z=Q+R+S+U+V+W$ which is a quantity taking part in the logical conditions of the functions $R_{FK}$ referred to above.

The entire automaton has been realized on the basis of equations (y20) to (y23), that is to say the members at the right-hand sides of equations from (y20) to (y33), with the exception of the function Z, are obtained by means of the given matrix (32). The latter has 13 inputs: $\alpha_0$, $\alpha_1$, and $\alpha_2$, $\alpha_3$ and $\alpha_4$ obtained additionally by means of the OR-gates 26 and 27 and the outputs of the triggers 28, 29, 30, and 31. The matrix has 22 outputs, at each one of which there is obtained the state "1" at a particular state of the triggers and a particular input pulse, as has been shown on table 2 which is an "abridged" truth table for matrix 32.

0002 NO CARD FOR THIS ILLUSTRATION.
A

The OR-gates 33, 34, 35 to 41 inclusive serve to obtain the functions from equation (y20) to equation (y34) with the exception of equation (y23) only. The elements themselves are connected as follows:

The inputs of the OR-gate 33 are connected to outputs first and ninth of 32, the output being connected to the set input of 28.

The inputs of the OR-gate 34 are connected to the third and eighth outputs of 32, the output being connected to the set input of 29.

The inputs of the OR-gate 35 are connected to the fourth, seventh, and twelfth outputs of 32, the output being connected to the set input of 30.

The inputs of the OR-gate 36 are connected to the fifth input of 32 and to the output of the OR-element 41, the output being connected to the reset input of 28.

The inputs of the OR-gate 37 are connected to the sixth and tenth outputs of 32 and to the output of 41, the output being connected to the reset input of 29.

The inputs of the OR-gate 38 are connected to the eleventh output of 32 and to the output of 41, the output being connected to the reset input of 30.

The set and reset inputs of 31 are connected to the second output of 32 and to the output of 41 respectively.

The inputs of the OR-gate 39 are connected to the thirteenth and fourteenth outputs of 32, the output being connected to one of the outputs of 41 and at the same time being the output Q of block 4.

The inputs of the OR-gate 40 are connected to the fifteenth, sixteenth, seventeenth, and eighteenth outputs of 32, the output being connected to one of the inputs of 41 and at the same time being the output R of block 4.

The remaining nineteenth, twentieth, twenty-first, and twenty-second outputs of 32 are separately connected to one of the inputs of 32 and are at the same time outputs S, U, V, and W of block 4.

The outputs Q, R, S, U, V, and W of the analyzer block 4 are connected separately to the inputs of six groups of binary decade counters designated as block 5 on FIG. 1. Irregularities of a particular type are counted and memorized in each counter. Provided in Block 5 are two more groups of binary decade counters for counting the total number of characteristic pulses X received for processing as well as the number of pulses of negative polarity Y.

The information of the binary-decade counters is shown on digit lamps.

What we claim is:

1. A method of automatically analyzing disturbances of the rhythm of the heart, comprising the steps of:
   automatically analyzing a sequence of cardiac R-waves and converting same into normal pulses occurring within a predetermined time interval following a preceding pulse, delayed pulses occurring at a time interval greater than said predetermined time interval after the preceding pulse and accelerated pulses occurring at a time interval less than the predetermined time interval after the preceding pulse;
   storing information representing a multiplicity of cardiac conditions in the form of sequences of said pulses;
   comparing a current pulse train of such pulses with the stored information and generating a respective output signal upon the coincidence of the current pulse train with a corresponding pulse sequence of the stored information representing an indication of the corresponding condition; and
   counting the incidences of the output signals of the respective condition.

2. A system for the automatic analysis of the disturbances of the rhythm of the heart, comprising:
   sensing means for producing an electrical wave representing the function of the heart of a biological subject;
   amplifier means connected with said sensor means and producing a pulse train representing said wave;
   logic-circuit means for classifying the pulses of said train into normal pulses occurring within a predetermined time interval following a preceding pulse, delayed pulses occurring at a predetermined time interval greater than said predetermined time interval after the preceding pulse and accelerated pulses occurring at a time interval less than the predetermined time interval after the preceding pulse;
   analyzer means including a memory registering a multiplicity of sequences of the normal, delayed and accelerated pulses representing respective cardiac conditions, and means connected with said logic circuit, means for producing a respective output signal upon coincidence of the pulse sequence derived from said logic circuit means with one of the pulse sequences registered in said memory; and
   means for counting the output pulses associated with the respective conditions.

3. The system defined in claim 2 wherein said logic circuit means comprises:
   a pair of first monostable circuits;
   a first AND-gate receiving an input from said amplifier means and having an output connected to said pair of first monostable circuits;
   a respective time-determining potentiometer in each of said first monostable circuits representing the predetermined time interval;
   a pair of further monostable circuits each connected to one of said potentiometers and with a respective one of said first monostable circuits;
   respective OR gates connected to and energized by the outputs of the monostable circuits provided with the respective potentiometer;
   a first and second NOT gate; and
   three further AND-gates all of said further AND-gates receiving input pulses forming the input to said first AND-gate, one of said further AND-gates receiving the output of one of said OR gates through said first NOT gate and the output of the other OR gate directly, another of said further AND-gates receiving an input from said first NOT gate and from said other OR gate through said second NOT gate, the third further AND gate receiving input signals from both said OR gates directly, the output of one of said NOT gates forming an input to said first AND gate.

4. The system defined in claim 3 wherein said analyzing means comprises:
   a set of OR gates;
   a bank of set-reset flip-flops forming said memory;
   a diode matrix having one array of conductors connected to the outputs of said flip-flops and other conductors of said array connected to the outputs of said further AND gates directly and via OR gates of said set having the outputs of said further AND gates as inputs; and
   another array of conductors, some of said conductors of said other array being connected through respective OR gates of said set to the inputs of said flip-flops and other conductors of said other array being connected to said counting means.

* * * * *